US010006384B2

(12) United States Patent
Matsumoto et al.

(10) Patent No.: US 10,006,384 B2
(45) Date of Patent: Jun. 26, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yosuke Matsumoto, Susono (JP); Yasuhiro Kuze, Numazu (JP); Noriyasu Adachi, Numazu (JP); Yusuke Saito, Susono (JP); Satoru Tanaka, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 408 days.

(21) Appl. No.: 14/693,253

(22) Filed: Apr. 22, 2015

(65) Prior Publication Data

US 2015/0308358 A1 Oct. 29, 2015

(30) Foreign Application Priority Data

Apr. 24, 2014 (JP) .................. 2014-090536

(51) Int. Cl.
F02D 23/00 (2006.01)
F02B 33/44 (2006.01)
(Continued)

(52) U.S. Cl.
CPC ........ F02D 41/0007 (2013.01); F02B 37/002 (2013.01); F02B 37/127 (2013.01);
(Continued)

(58) Field of Classification Search
CPC .... F02B 37/001; F02B 37/004; F02B 37/007; F02B 37/013; F02B 37/16; F02B 37/18–37/186
(Continued)

(56) References Cited

U.S. PATENT DOCUMENTS 5,845,495 A 12/1998 Schray et al.
7,028,678 B2 4/2006 Betz et al.
(Continued)

FOREIGN PATENT DOCUMENTS

EP 1557549 A2 7/2005
JP S62-76252 U 5/1987
(Continued)

OTHER PUBLICATIONS

Specification of the U.S. Appl. No. 15/047,012, 35 pages.
(Continued)

Primary Examiner — Ngoc T Nguyen
(74) Attorney, Agent, or Firm — Hunton Andrews Kurth LLP

(57) ABSTRACT

A time point $t_0$ represents a time point when a turbocharged engine is brought into a decelerating state, and an opening degree of a throttle valve is decreased. A time point $t_1$ represents a time point when an opening command to an ABV is issued. When the ABV has an abnormality, and when a WGV is stuck open, a turbocharging pressure before the time point $t_0$ shows a tendency to fall below a target turbocharging pressure, and a turbocharging pressure after the time point $t_1$ reduces slowly to approach a predetermined pressure. When the WGV is stuck closed, a turbocharging pressure before the time point $t_0$ shows a tendency to exceed the target turbocharging pressure, and the turbocharging pressure after the time point $t_1$ reduces with vigor to approach the predetermined pressure.

14 Claims, 7 Drawing Sheets

(51) Int. Cl.
*F02D 41/00* (2006.01)
*F02B 37/00* (2006.01)
*F02B 37/16* (2006.01)
*F02B 37/18* (2006.01)
*F02D 41/22* (2006.01)
*F02B 37/12* (2006.01)

(52) U.S. Cl.
CPC .............. *F02B 37/16* (2013.01); *F02B 37/18* (2013.01); *F02B 37/186* (2013.01); *F02D 41/22* (2013.01); *F02B 2037/162* (2013.01); *F02D 2200/0406* (2013.01); *Y02T 10/144* (2013.01); *Y02T 10/40* (2013.01)

(58) Field of Classification Search
USPC ........................... 60/602, 611, 612; 123/562
See application file for complete search history.

(56) References Cited

U.S. PATENT DOCUMENTS

| | | | |
|---|---|---|---|
| 2007/0163258 A1 | 7/2007 | Narita et al. | |
| 2008/0216788 A1 | 9/2008 | Henrich et al. | |
| 2011/0265454 A1 | 11/2011 | Smith et al. | |
| 2012/0210710 A1* | 8/2012 | Chevalier | F02B 39/16 60/602 |
| 2012/0210711 A1* | 8/2012 | Petrovic | F02B 37/013 60/602 |
| 2013/0006494 A1* | 1/2013 | Petrovic | F02D 41/024 701/102 |
| 2013/0008417 A1* | 1/2013 | Sankar | F02D 41/0047 123/568.12 |
| 2013/0167528 A1 | 7/2013 | Schlund et al. | |
| 2014/0366529 A1 | 12/2014 | Komatsu | |
| 2015/0219024 A1* | 8/2015 | Kurashima | F02B 27/0273 123/321 |

FOREIGN PATENT DOCUMENTS

| | | |
|---|---|---|
| JP | H11-509908 A | 8/1999 |
| JP | 2005-207398 A | 8/2005 |
| JP | 2005-291020 A | 10/2005 |
| JP | 2005-344707 A | 12/2005 |
| JP | 2006-307677 A | 11/2006 |
| JP | 2006-322335 A | 11/2006 |
| JP | 2009-250068 A | 10/2009 |
| JP | 2010-038077 A | 2/2010 |
| JP | 2010-106787 A | 5/2010 |
| JP | 2012-180822 A | 9/2012 |
| JP | 2012-188994 A | 10/2012 |
| JP | 2013-096372 A | 5/2013 |
| WO | 2006/123760 A1 | 11/2006 |
| WO | WO 2011007456 A1 * | 1/2011 ............ F02B 37/004 |

OTHER PUBLICATIONS

U.S. Patent and Trademark Office, Non-Final Office Action in U.S. Appl. No. 15/047,012, dated Jul. 27, 2017, 18 pages.
U.S. Patent and Trademark Office, Final Office Action in U.S. Appl. No. 15/047,012, dated Feb. 5, 2018, 19 pages.

* cited by examiner

CONTROL DEVICE FOR INTERNAL COMBUSTION ENGINE

CROSS-REFERENCE TO RELATED APPLICATION

The present application claims priority to Japanese Patent Application No. 2014-090536 filed on Apr. 24, 2014, which is incorporated herein by reference in its entirety.

BACKGROUND

Field of the Application

The present application relates to a control device for an internal combustion engine, and more particularly relates to a control device for an internal combustion engine including a turbocharger.

Background Art

Conventionally, Japanese Patent Laid-Open No. 2013-096372, for example, discloses a device which detects an abnormal state (a stuck state) of an air bypass valve (ABV) and a wastegate valve (WGV), in an internal combustion engine including the ABV which is provided in the passage bypassing the compressor of a turbocharger, and the WGV which is provided in the passage bypassing the turbine of the turbocharger. The device issues a command to open the ABV when the engine operation state enters a predetermined surge region, and detects that the ABV is stuck closed based on the time period required until the engine operation state gets out of the predetermined surge region, after the issuance of the command.

Further, the device determines whether the ABV is stuck open or the WGV is stuck open by comparing the estimated value of the turbocharging pressure which is calculated in advance in a specific engine operation state where the WGR is opened, with the actual measured value of a pressure in the passage provided with the ABV in the specific engine operation state. More specifically, the device determines that the ABV is stuck open when the actual measured value is smaller than the estimated value, and determines that the WGV is stuck open when the actual measured value is larger than the estimated value. In this way, according to the device in Japanese Patent Laid-Open No. 2013-096372, sticking open and sticking closed of the ABV, and sticking open of the WGV can be determined.

Further, National Publication of International Patent Application No. 11-509908 discloses a device which detects an abnormality of an exhaust system in an internal combustion engine which includes two intake manifolds, two exhaust manifolds, two intake passages, two exhaust passages, two turbochargers, two ABVs and two WGVs corresponding to two cylinder banks, and a common intake passage between the two intake manifolds and the two intake passages. More specifically, the device compares the exhaust pressures or the exhaust gas flow rates in the respective exhaust manifolds. When the exhaust pressure difference or the exhaust flow rate difference exceeds a threshold value, the device estimates that either one of the exhaust systems has a fault.

Other prior arts include Japanese Patent Laid-Open No. 2010-106787, Japanese Patent Laid-Open No. 2005-344707, Japanese Patent Laid-Open No. 2005-207398, Japanese Patent Laid-Open No. 2006-322335, Japanese Patent Laid-Open No. 2012-188994, Japanese Patent Laid-Open No. 2012-180822, and Japanese Utility Model Laid-Open No. 62-76252.

An internal combustion engine having a configuration as in National Publication of International Patent Application No. 11-509908 includes two ABVs and two WGVs, and therefore, it is desirable to be able to detect which one of the ABVs and the WGVs, the number of which are four in total, has an abnormality accurately. However, the device disclosed in Japanese Patent Laid-Open No. 2013-096372 is not premised on the internal combustion engine with the configuration as disclosed in National Publication of International Patent Application No. 11-509908. Further, the device in National Publication of International Patent Application No. 11-509908 can only estimate that either one of the exhaust systems has a fault, and cannot determine which one of the ABVs and the WGVs has an abnormality.

SUMMARY OF THE INVENTION

The present invention has been made in the light of the problem as above, and has an object to determine to which one of four ABVs and WGVs an abnormality occurs, in an internal combustion engine including two intake manifolds, two exhaust manifolds, two intake passages, two exhaust passages, two turbochargers, two ABVs and two WGVs that correspond to two cylinder groups, and including a common intake passage between the two intake manifolds and the two intake passages.

A first aspect of the present invention is a control device for an internal combustion engine. The internal combustion engine includes a first cylinder group to which a first intake manifold and a first exhaust manifold are connected; a second cylinder group to which a second intake manifold and a second exhaust manifold are connected; a first upstream intake passage and a second upstream intake passage that are connected to the first intake manifold and the second intake manifold via a common downstream intake passage; a first air bypass valve provided in a passage bypassing a first compressor mounted to the first upstream intake passage; a second air bypass valve provided in a passage bypassing a second compressor mounted to the second upstream intake passage; a first wastegate valve provided in a passage bypassing a first turbine that is mounted to the first exhaust manifold and that is connected to the first compressor; and a second wastegate valve provided in a passage bypassing a second turbine that is mounted to the second exhaust manifold and that is connected to the second compressor.

The control device includes a throttle valve that is provided in the downstream intake passage, a pressure sensor that measures a pressure upstream of the throttle valve in the downstream intake passage, feedback control means, first rate of reduction calculating means, second rate of reduction calculating means, and abnormality determining means. The feedback control means is configured to correct opening degrees of the first wastegate valve and the second wastegate valve so that a measured turbocharging pressure by the pressure sensor approaches a target turbocharging pressure. The first rate of reduction calculating means is configured to issue an opening command to the first air bypass valve at a time of deceleration of the internal combustion engine when an absolute value of a feedback correction amount by the feedback control means exceeds a predetermined value, and calculating a first rate of reduction of the measured turbocharging pressure. The second rate of reduction calculating means is configured to issue an opening command to the second air bypass valve at the time of deceleration of the internal combustion engine when the absolute value exceeds the predetermined value again after calculation of the first rate of reduction, and calculating a second rate of reduction of the measured turbocharging pressure. The abnormality determining means is configured to determine to which one of the first air bypass valve, the second air bypass valve, the first wastegate valve and the second wastegate valve, an abnormality occurs, based on the feedback correction amount, the first rate of reduction, and the second rate of reduction.

A second aspect of the present invention is such that, in the first invention, the abnormality determining means compares the first rate of reduction with the second rate of reduction when the feedback correction amount has a positive value, determines that the abnormality occurs to the first wastegate valve when the first rate of reduction is lower than the second rate of reduction, and determines that the abnormality occurs to the second wastegate valve when the second rate of reduction is lower than the first rate of reduction.

A third aspect of the present invention is such that, in the first invention, the abnormality determining means compares the first rate of reduction with the second rate of reduction when the feedback correction amount has a negative value, determines that the abnormality occurs to the first wastegate valve when the first rate of reduction is higher than the second rate of reduction, and determines that the abnormality occurs to the second wastegate valve when the second rate of reduction is higher than the first rate of reduction.

A fourth aspect of the present invention is such that, in the second or the third invention, the abnormality determining means compares the first rate of reduction and the second rate of reduction with a predetermined rate of reduction before comparing the first rate of reduction with the second rate of reduction, determines that the abnormality occurs to the first air bypass valve when the first rate of reduction is lower than the predetermined rate of reduction, and determines that the abnormality occurs to the second air bypass valve when the second rate of reduction is lower than the predetermined rate of reduction.

A fifth aspect of the present invention further includes, in the second or the third invention, countermeasure control means configured to perform countermeasure control corresponding to a cause of an abnormal state when the abnormality of the first wastegate valve or the second wastegate valve is determined.

According to the first to the fourth aspects of the present invention, in the internal combustion engine in which two cylinder groups which are separately connected to the two exhaust systems are connected to the two intake systems via the common intake passage, and the two turbochargers, the two ABVs and the two WGVs corresponding to the respective cylinder groups are included, to which one of the four valves an abnormality occurs can be determined, based on the first rate of reduction and the second rate of reduction of the measured turbocharging pressure in the case of the absolute value of the feedback correction amount exceeding the predetermined value. Accordingly, a repair and a replacement work for the valve which is determined as abnormal can be easily performed.

According to the fifth aspect of the present invention, when the abnormality occurs to the first wastegate valve or the second waste gate valve, the countermeasures corresponding to the cause of the abnormality can be taken. Accordingly, before the repair or the replacement work for the wastegate valve which is determined as abnormal is performed, a new trouble can be prevented from occurring from the cause of the abnormality.

DETAILED DESCRIPTION OF THE PREFERRED EMBODIMENTS

Hereinafter, embodiments of the present invention will be described with reference to the drawings. Note that when numerals such as numbers, quantities, amounts and ranges of respective elements are mentioned in the embodiments shown as follows, the present invention is not limited to the numerals mentioned therein unless otherwise specified or unless clearly specified to be the numerals theoretically. Further, structures, steps and the like described in the embodiments shown as follows are not always essential to the present invention unless otherwise specified or unless clearly specified thereto theoretically.

First Embodiment
[Explanation of System Configuration]

Figure 1:
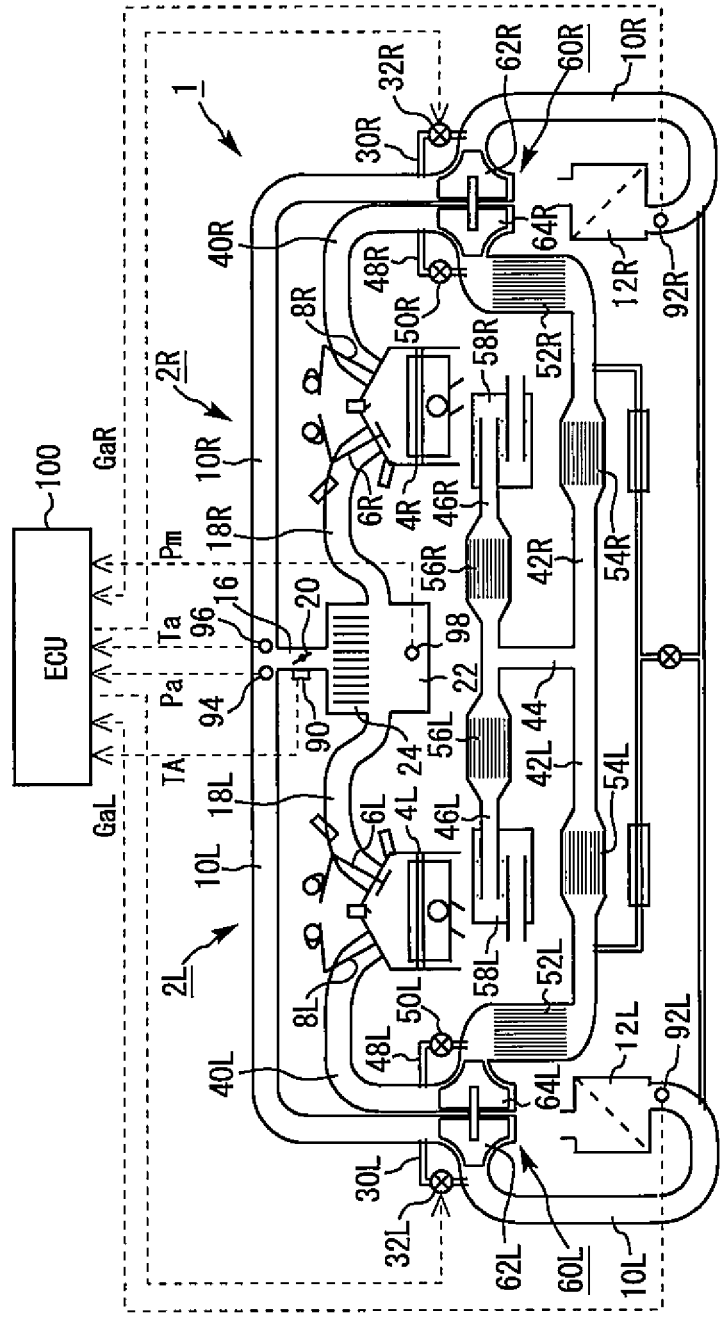
FIG. 1 is an explanatory diagram of an entire configuration of a system in a first embodiment of the present invention.

FIG. 1 is an explanatory diagram of an entire configuration of a system in a first embodiment of the present invention. As shown in FIG. 1, the system of the first embodiment includes a turbocharged engine 1. The turbocharged engine 1 is a V engine having a left bank 2L and a right bank 2R, and is configured to be capable of switching over between a lean burn operation and a stoichiometric burn operation in accordance with an operation region that is set by an engine speed and engine torque. In FIG. 1, in each of the respective banks 2L and 2R, corresponding one of cylinders 4L and 4R is expressed. However, in reality, each of the banks 2L and 2R has a plurality of cylinders. In the first embodiment, the turbocharged engine 1 is a spark ignition direct injection engine, and an ignition plug and a cylinder injection valve are mounted to each of the cylinders. Note that in the explanation of the embodiments as follows, the same members installed in the respective left bank 2L and right bank 2R are expressed by being assigned with a letter of "L" or "R" behind the same numerals respectively.

First, an intake system of the turbocharged engine 1 will be described. An intake manifold 18L is connected to the cylinder 4L of the left bank 2L via an intake valve 6L. An intake manifold 18R is connected to the cylinder 4R of the right bank 2R via an intake valve 6R. The left and the right intake manifolds 18L and 18R are connected to a common surge tank 22. The surge tank 22 is integrated with a water-cooled intercooler 24, and a pressure sensor 98 that outputs a signal corresponding to an internal pressure is mounted to the surge tank 22. One intake passage 16 is connected to the surge tank 22. A throttle valve 20 is disposed in the intake passage 16. A throttle opening degree sensor 90 that outputs a signal corresponding to an opening degree of the throttle valve 20 is mounted to the throttle valve 20.

In the intake passage 16, two intake passages 10L and 10R corresponding to the respective banks 2L and 2R meet each other. A position where the throttle valve 20 is provided is downstream of a position where the intake passages 10L and 1 OR meet, in a flow of air. Hereinafter, the intake passages 10L and 10R located at an upstream side will be called upstream intake passages respectively. Upstream of the throttle valve 20, that is, in a vicinity of a site where the two upstream intake passages 10L and 10R meet each other, a pressure sensor 94 that outputs a signal corresponding to a pressure in a space thereof, and a temperature sensor 96 that outputs a signal corresponding to a temperature in the space are installed. Air cleaners 12L and 12R, and air flow meters 92L and 92R that output signals corresponding to flow amounts of the air taken in are installed at air intake ports in the respective upstream intake passages 10L and 10R.

The turbocharged engine 1 includes turbochargers 60L and 60R in the respective left and right banks 2L and 2R. In the left bank 2L, a compressor 62L of the turbocharger 60L is mounted to the upstream intake passage 10L. In the right bank 2R, a compressor 62R of the turbocharger 60R is mounted to the upstream intake passage 10R.

The upstream intake passage 10L in the left bank 2L is provided with a bypass channel 30L that bypasses the compressor 62L. In the bypass channel 30L, an ABV 32L that controls shutoff/communication of the bypass channel 30L is disposed. Likewise, in the right bank 2R, a bypass channel 30R that bypasses the compressor 62R is provided in the upstream intake passage 10R, and an ABV 32R is disposed in the bypass channel 30R. The ABVs 32L and 32R are electromagnetically-driven valves that are driven by solenoids. Note that in the following explanation, the ABVs 32L and 32R will be called "ABVs 32" when the ABVs 32L and 32R are not identified.

Next, an exhaust system of the turbocharged engine 1 will be described. An exhaust manifold 40L is connected to the cylinder 4L of the left bank 2L via an exhaust valve 8L, and an exhaust manifold 40R is connected to the cylinder 4R of the right bank 2R via an exhaust valve 8R. In the left bank 2L, a turbine 64L of the turbocharger 60L is mounted to the exhaust manifold 40L. Further, a bypass channel 48L that bypasses the turbine 64L is provided, and in the bypass channel 48L, a WGV 50L is disposed. In the right bank 2R, a turbine 64R of the turbocharger 60R is mounted to the exhaust manifold 40R, and a bypass channel 48R that bypasses the turbine 64R is provided. A WGV 50R is disposed in the bypass channel 48R. The WGVs 50L and 50R are electromagnetically-driven valves that are driven by solenoids. Note that in the following explanation, the WGVs 50L and 50R will be called "WGVs 50" when the WGVs 50L and 50R are not identified.

In the left bank 2L, a first pre-stage catalyst 52L is mounted to an outlet of the turbine 64L, and an exhaust passage 42L is connected to the first pre-stage catalyst 52L. Likewise, in the right bank 2R, an exhaust passage 42R is connected to an outlet of the turbine 64R via a first pre-stage catalyst 52R. In the respective exhaust passages 42L and 42R, second pre-stage catalysts 54L and 54R are disposed. The two exhaust passages 42L and 42R meet each other to be one exhaust passage 44, and branches into two exhaust passages 46L and 46R again under a floor of a vehicle. In the respective exhaust passages 46L and 46R, underfloor catalysts 56L and 56R are disposed, and silencers 58L and 58R are further mounted.

Further, as shown in FIG. 1, the system of the first embodiment includes an ECU (Electronic Control Unit) 100. The ECU 100 has at least an input/output interface, a memory and a CPU. The input/output interface is provided to take in sensor signals from various sensors mounted to the turbocharged engine 1 and the vehicle, and to output operation signals to actuators included by the turbocharged engine 1. The sensors from which the ECU 100 takes in signals also include an air-fuel ratio sensor, an accelerator pedal sensor, an engine speed sensor, an atmospheric pressure sensor and the like (not shown), besides the aforementioned sensors 90, 92L, 92R, 94, 96 and 98. The actuators to which the ECU 100 outputs the operation signals also include an ignition device, a fuel injection device, a variable valve timing device and the like (not shown) besides the throttle valve 20, the ABV 32, and the WGV 50. In the memory, various control programs for controlling the turbocharged engine 1 are stored. The CPU reads the control program from the memory and executes the control program, and generates an operation signal based on the sensor signal which is taken in.

In the first embodiment, the control executed by the ECU 100 includes turbocharging pressure control for controlling an intake pipe pressure (hereinafter, called "turbocharging pressure") between the compressor 62L or the compressor 62R, and the throttle valve 20, surge avoidance control for avoiding surge of the compressors 62L and 62R, and operation mode switch control for switching an operation mode. In the turbocharging pressure control, turbocharging pressure feedback control is performed, which feeds back a pressure difference between a target turbocharging pressure and a measured turbocharging pressure (in the embodiment, referring to a pressure Pa upstream of the throttle valve 20 which is measured by using the pressure sensor 94; the same shall apply hereinafter) to an operation amount of the WGV 50. In the turbocharging pressure feedback control, for the target turbocharging pressure, at least an atmospheric pressure measured by using the atmospheric sensor and an accelerator pedal opening degree which is measured by using the accelerator pedal sensor are used.

Figure 2:
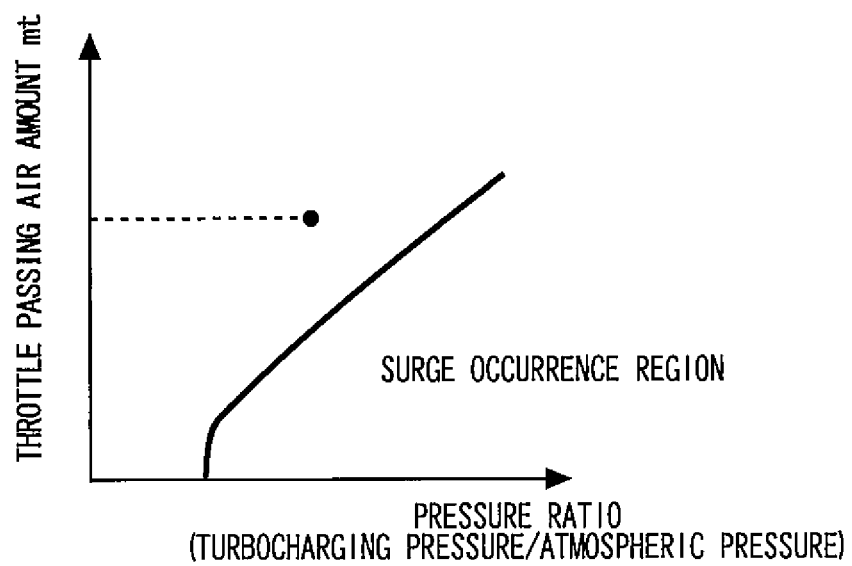
FIG. 2 shows a surge occurrence region.

The surge avoidance control is control that simultaneously opens both the ABVs 32L and 32R when an operation region of the turbocharged engine 1 enters a surge occurrence region. In the turbocharged engine, the opening degree of the throttle valve is degreased during deceleration, whereby the air passing through the compressor has nowhere to go to flow backward, and surge sometimes occurs to the compressor. It is the surge occurrence region that sets the operation region where the surge occurs. FIG. 2 shows the surge occurrence region. The surge occurrence region is determined based on a pressure ratio (=the turbocharging pressure/atmospheric pressure), and a throttle passing air amount mt which passes through the throttle valve 20. In calculation of the pressure ratio, the atmospheric pressure which is measured by using the atmospheric pressure sensor, and a measured turbocharging pressure are used. In calculation of the throttle passing air amount mt, the measured turbocharging pressure, and a throttle opening degree that is measured by the throttle opening degree sensor 90 are used.

The operation mode switch control is control that switches an operation mode between a stoichiometric operation and a lean operation in response to an operation region of the turbocharged engine 1 which is set by the engine speed and torque. The operation mode switch control is performed as common control to the right bank 2R and the left bank 2L, but may be made independent control in each of the left and the right banks. That is to say, lean burn may be performed in the cylinder 4L of the left bank 2L while stoichiometric burn is performed in the cylinder 4R of the right bank 2R. In the operation mode switch control, the engine speed which is measured by using the engine speed sensor, and the accelerator pedal opening degree which is measured by using the accelerator pedal sensor are used at least.

[Features of First Embodiment]

As described with FIG. 1, the turbocharged engine 1 includes the turbochargers 60L and 60R corresponding to the respective left bank 2L and right bank 2R, and the left bank 2L and the right bank 2R are connected to the common intake passage 16. Therefore, even when either one of the WGV 50L or 50R fails to be in a state incapable of turbocharging, the air taken in at the left and the air taken in at the right meet each other in the intake passage 16, and therefore, it is difficult to determine at which bank side the abnormality occurs. Therefore, in the first embodiment, abnormality diagnosis is performed, which opens the ABVs 32L and 32R individually when the turbocharged engine 1 is in a deceleration state, and determines at which bank side the abnormality occurs based on the output from the pressure sensor 94 at this time.

Figure 3:
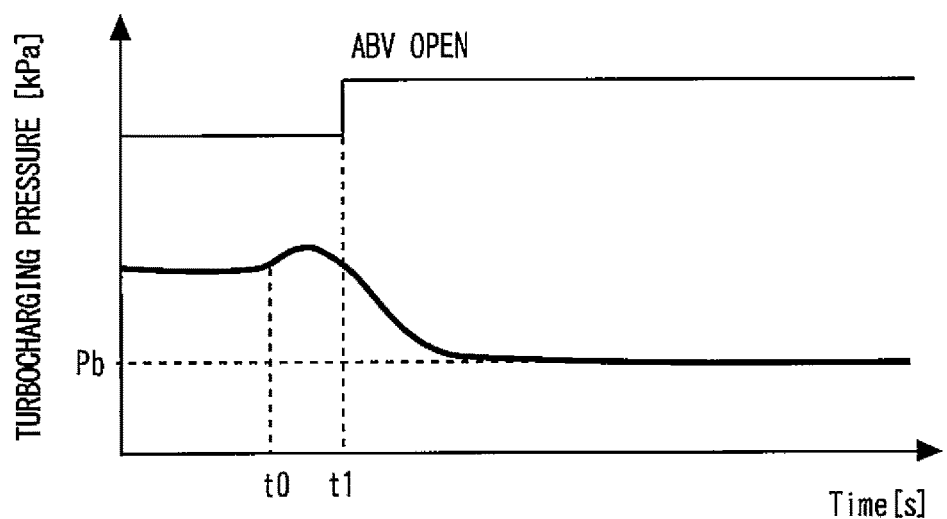
FIG. 3 shows a behavior of a turbocharging pressure in a case of a WGV 50 operating normally.
Figure 4:
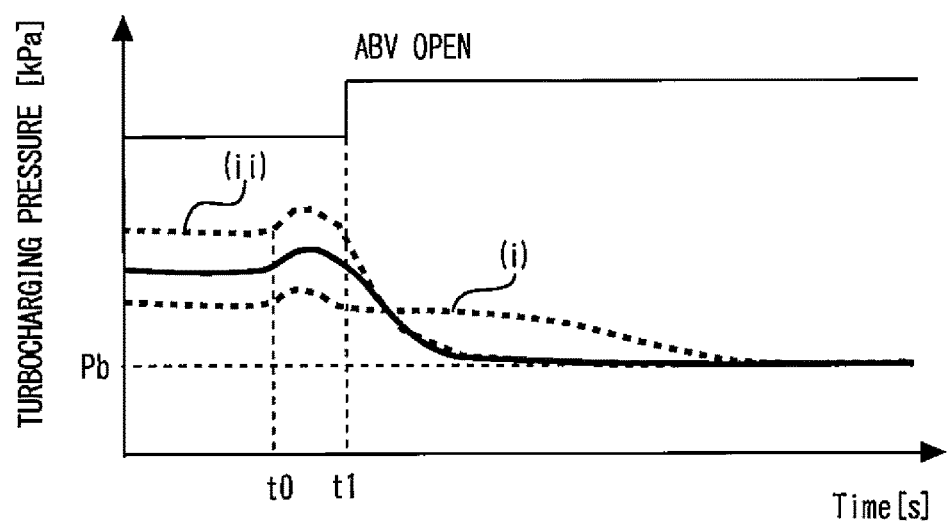
FIG. 4 shows the behavior of the turbocharging pressure in a case of the WGV 50 having an abnormality.
Figure 5:
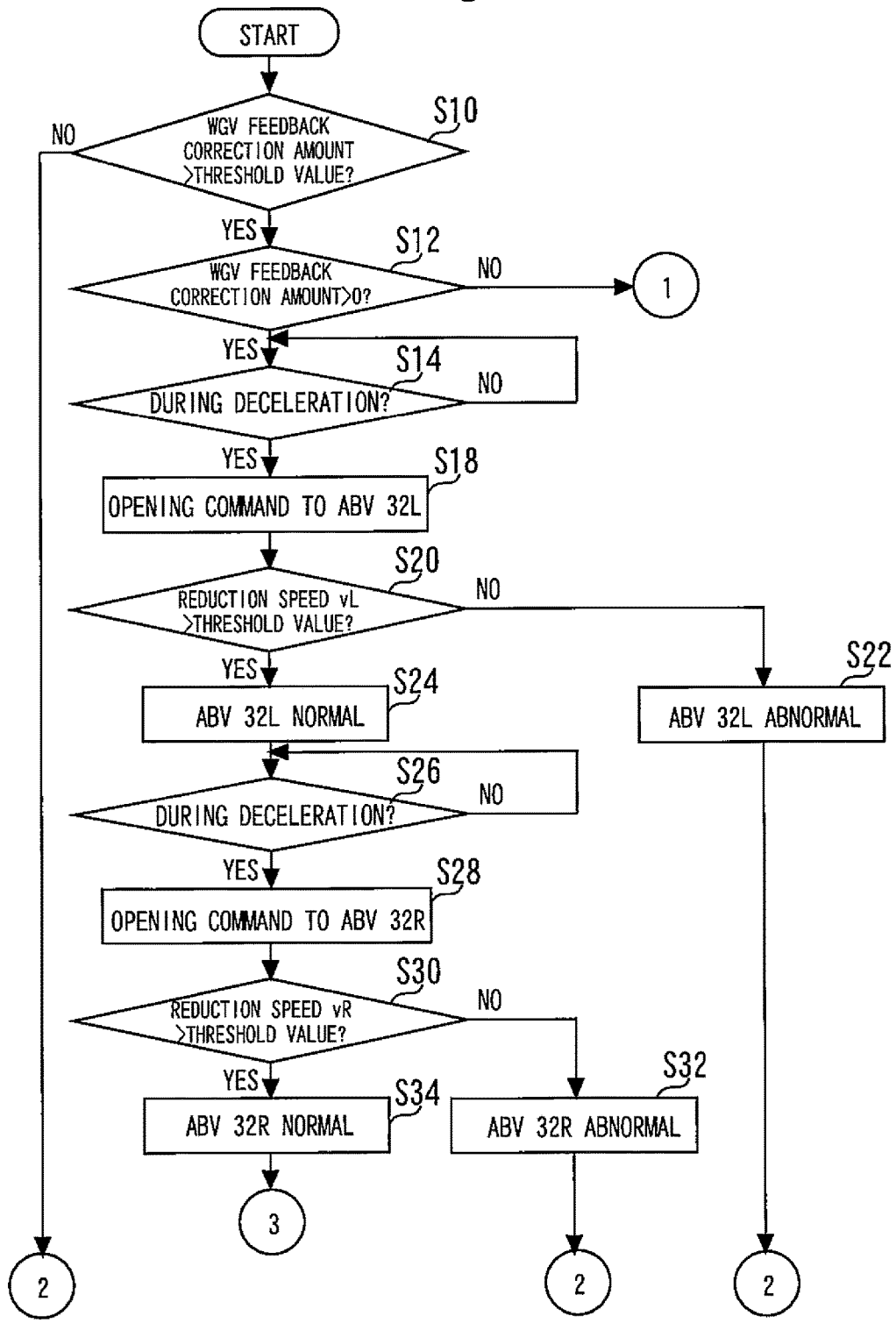
FIG. 5 is an explanatory diagram of an abnormality diagnosis routine executed by an ECU 100 in the first embodiment.
Figure 6:
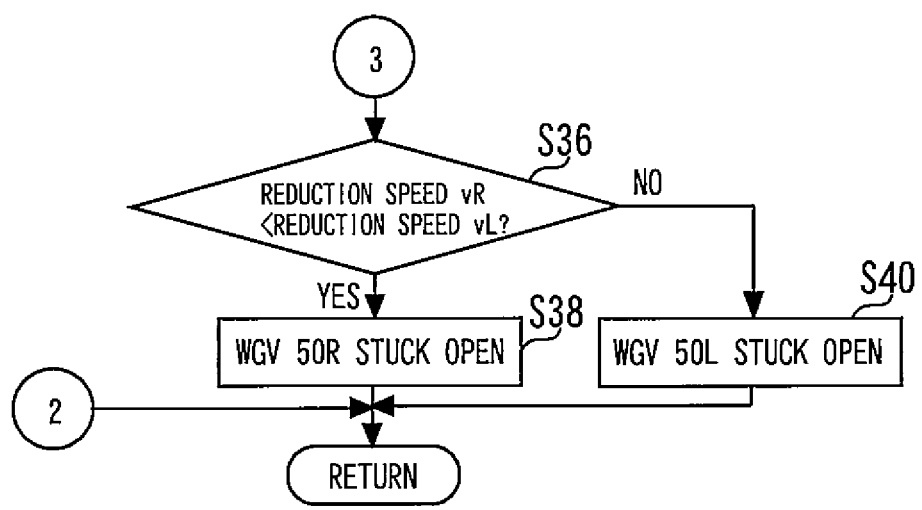
FIG. 6 is an explanatory diagram of the abnormality diagnosis routine executed by the ECU 100 in the first embodiment.
Figure 7:
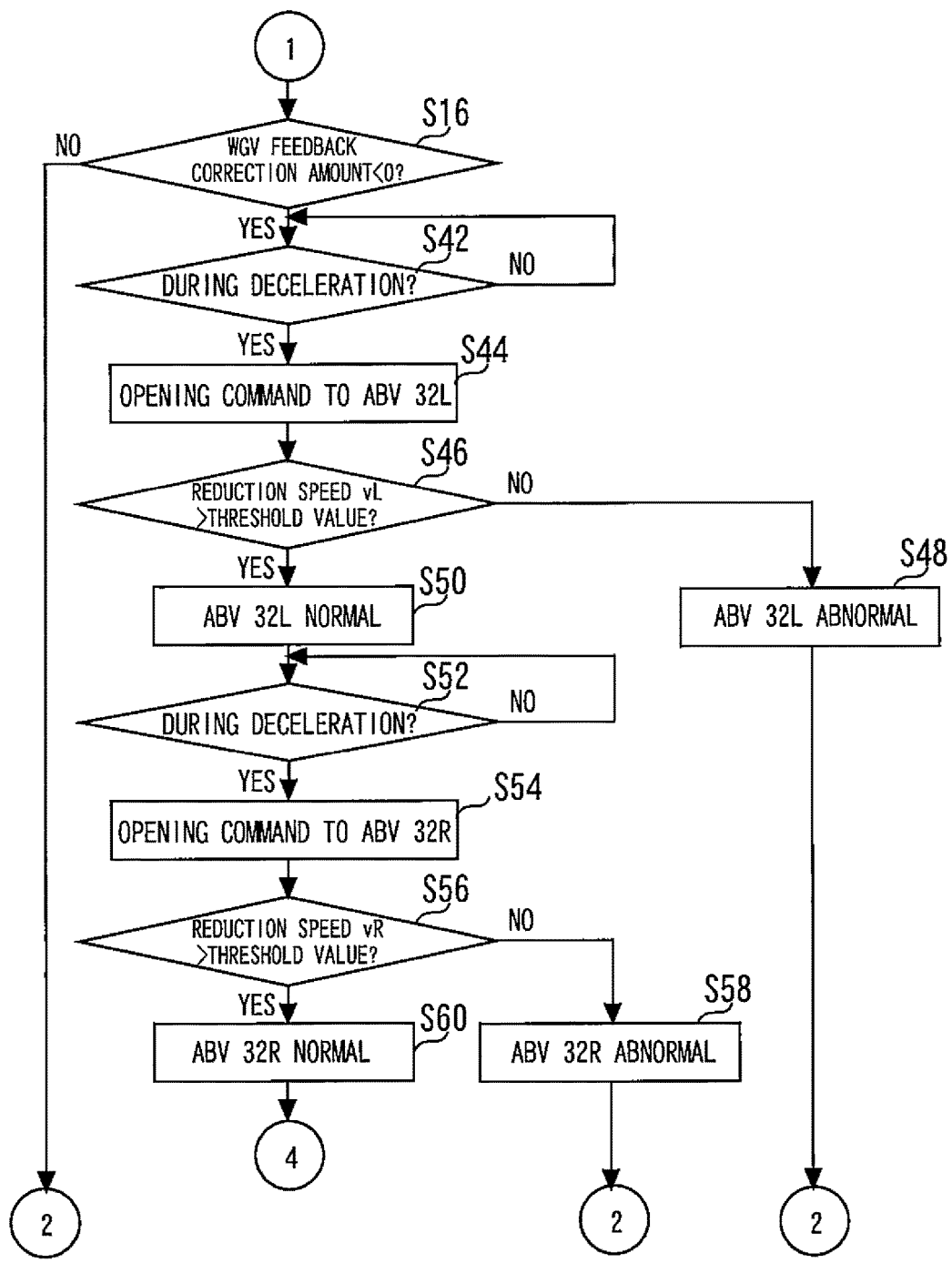
FIG. 7 is an explanatory diagram of the abnormality diagnosis routine executed by the ECU 100 in the first embodiment.
Figure 8:
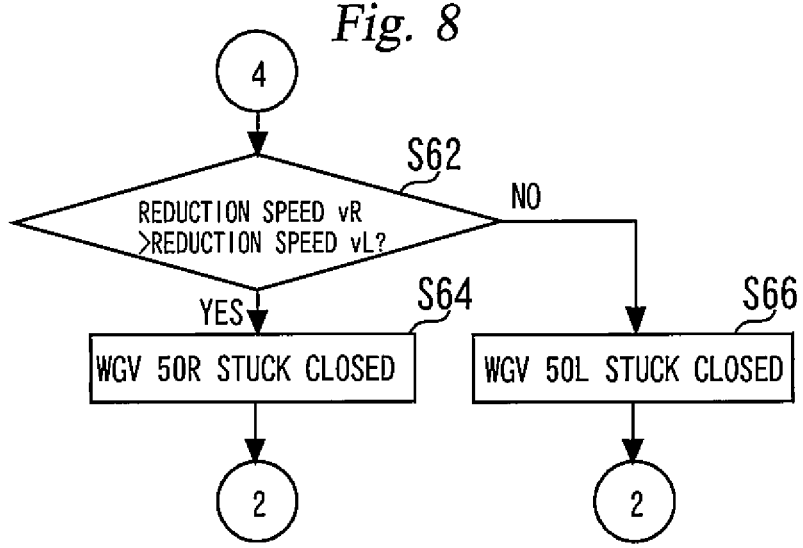
FIG. 8 is an explanatory diagram of the abnormality diagnosis routine executed by the ECU 100 in the first embodiment.

Details of the abnormality diagnosis in the first embodiment will be described with reference to FIGS. 3 to 5. FIG. 3 shows a behavior of a turbocharging pressure in a case of the WGV 50 operating normally. A time point $T_0$ in FIG. 3 represents a time point when the turbocharged engine 1 is brought into a deceleration state, and the opening degree of the throttle valve 20 is decreased. A time point $t_1$ in FIG. 3 represents a time point when a command for opening the ABV 32 is issued. When the ABV 32 and the WGV 50 operate normally, the turbocharging pressure before the time point $t_0$ follows a target turbocharging pressure, and by opening the ABV 32 by the opening command, the turbocharging pressure quickly reduces to approach a predetermined pressure Pb.

Meanwhile, when the ABV 32 and the WGV 50 have an abnormality, the turbocharging pressure shows a behavior different from the behavior at the normal operation time. FIG. 4 shows a behavior of the turbocharging pressure in a case of the WGV 50 having an abnormality. A solid line shown in FIG. 4 shows the behavior of the turbocharging pressure at the normal operation time shown in FIG. 3. When the ABV 32 has an abnormality, and when the WGV 50 is stuck open (referring to a state stuck to an opening degree except for full closure to be unable to operate. The same shall apply hereinafter.), the turbocharging pressure before the time point $t_0$ cannot follow the target turbocharging pressure, and shows a tendency to fall below the target turbocharging pressure (a broken line (i) in FIG. 4). Further, the turbocharging pressure after the time point $t_1$ reduces slowly to approach the predetermined pressure Pb. That is to say, when the ABV 32 has an abnormality, and when the WGV 50 is stuck open, a reduction speed of the turbocharging pressure becomes lower as compared with the reduction speed at the time of normal operation. When the WGV 50 is stuck closed (referring to a state stuck fully closed to be unable to operate. The same shall apply hereinafter.), the state is other way round. That is to say, the turbocharging pressure before the time point $t_0$ shows a tendency to exceed the target turbocharging pressure, and the turbocharging pressure after the time point $t_1$ reduces with vigor to approach the predetermined pressure Pb (a broken line (ii) in FIG. 4). That is to say, when the WGV 50 is stuck closed, the reduction speed of the turbocharging pressure becomes higher as compared with the reduction speed at the time of the normal operation.

The abnormality diagnosis in the first embodiment is performed based on the aforementioned principle. FIGS. 5 to 8 are explanatory diagrams of an abnormality diagnosis routine executed by the ECU 100 in the first embodiment. The abnormality diagnosis routine is repeatedly executed at predetermined periods during an operation of the turbocharged engine 1.

In the routine shown in FIGS. 5 to 8, it is firstly determined whether or not an absolute value of a feedback correction amount of the WGV 50 continuously exceeds a predetermined threshold value (step S10). The feedback correction amount is repeatedly calculated in a routine of the turbocharging pressure feedback control which is executed separately from the present routine, and is based on the pressure difference between the target turbocharging pressure and the measured turbocharging pressure. When the absolute value of the feedback correction amount continuously exceeds the predetermined threshold value, it can be determined that either one of the left bank 2L or the right bank 2R has an abnormality, and therefore, the flow proceeds to processing in step S12. When the absolute value falls below the above described threshold value even once, both banks are determined as normal, and the present routine is ended. Note that the number of data of the feedback correction amount used in the determination of the present step can be set in accordance with the engine speed at the time of starting the processing of the present step, for example.

In step S12, it is determined whether or not the feedback correction amount has a positive value. Since the feedback correction amount is based on the pressure difference between the target turbocharging pressure and the measured turbocharging pressure, the case of the feedback correction amount continuously having a positive value means insufficiency of the turbocharging pressure. When it is determined that the feedback correction amount continuously has a positive value, it can be determined that the WGV 50 is likely to be stuck open, and therefore, processing of step S14 and the following steps is performed. Otherwise, processing of step S16 and the following steps is performed.

In step S14, it is determined whether or not the turbocharged engine 1 is in a decelerating state. Whether or not the turbocharged engine 1 is in a decelerating state can be determined from the output from the throttle opening degree sensor 90 and a change speed thereof. The processing of step S14 is repeatedly performed until the turbocharged engine 1 is brought into a decelerating state.

When the turbocharged engine 1 is determined as being in the decelerating state in step S14, an opening command to the ABV 32L is issued (step S18). Subsequently to step S18, it is determined whether or not a reduction speed $v_L$ of the measured turbocharging pressure is lower than a predetermined rate of reduction (step S20). The reduction speed $v_L$ is calculated by performing a time derivative of the output from the pressure sensor 94 after the opening command to the ABV 32L being issued. When the reduction speed $v_L$ is determined as lower than the above described predetermined rate of reduction, it is determined that an abnormality is likely to occur to the ABV 32L (step S22), and the present routine is ended. Meanwhile, when the reduction speed $v_L$ is determined as higher than the above described predetermined rate of reduction in step S20, the reduction speed $v_L$ is temporarily recorded in the ECU 100, and thereafter, the ABV 32L is determined as normal (step S24).

Subsequently to step S24, it is determined whether or not the turbocharged engine 1 is in the decelerating state, and the operation state of the turbocharged engine 1 which is defined by the engine speed and a load factor can be regarded as substantially the same as the operation state of the turbocharged engine 1 at the time of issuing the opening command in step S18 (step S26). Processing of the present step is performed by confirming establishment of the deceleration conditions of the turbocharged engine 1, and thereafter waiting until conditions concerning the operation state of the turbocharged engine 1 are established.

Subsequently to step S26, processing in steps S28 to S34 is performed. The processing is basically similar to the processing in steps S18 to S24, and in steps S18 to S24, the ABV 32L is replaced with the ABV 32R, the reduction speed $v_L$ of the turbocharging pressure is replaced with a reduction speed $V_R$ of the turbocharging pressure, respectively.

Subsequently to step S34, it is determined whether or not the reduction speed $v_R$ is lower than the reduction speed $v_L$ (step S36). More specifically, the reduction speed $v_L$ which is recorded in step S24, and the reduction speed $v_L$ which is recorded in step S34 are read, and compared. When the reduction speed $v_R$ is lower than the reduction speed $V_L$, it is determined that the WGV 50R is stuck open (step S38). When the reduction speed $v_L$ is lower than the reduction speed $v_R$, it is determined that the WGV 50L is stuck open (step S40). As described in the explanation of FIG. 4, when the WGV 50 is stuck open, the reduction speed of the turbocharging pressure becomes low. Accordingly, it can be determined that the WGV 50 with a lower reduction speed of the turbocharging pressure is stuck open, by performing the processing in step S36.

In step S16, it is determined whether or not the feedback correction amount has a negative value. A case of the feedback correction amount continuously having a negative value means that the turbocharging pressure is excessively high. When it is determined that the feedback correction amount continuously has a negative value, it can be determined that the WGV 50 is likely to be stuck closed, and therefore, processing in step S42 and the following steps is performed. Otherwise, it can be determined that the feedback correction amount is zero, and the WGV 50 operates normally, and therefore, the present routine is ended.

In steps S42 to S60, the same processing as the processing in steps S14 and S18 to S34 is executed.

Subsequently to step S60, it is determined whether or not the reduction speed $v_R$ is higher than the reduction speed $v_L$ (step S62). More specifically, the reduction speed $v_L$ which is recorded in step S50, and the reduction speed $v_R$ which is recorded in step S60 are read and compared. When the reduction speed $v_R$ is higher than the reduction speed $v_L$, it is determined that the WGV 50R is stuck closed (step S64). When the reduction speed $v_L$ is higher than the reduction speed $v_R$, it is determined that the WGV 50L is stuck closed (step S66). As described in the explanation of FIG. 4, when the WGV 50 is stuck closed, the reduction speed of the turbocharging pressure becomes high. Accordingly, it can be determined that the WGV 50 with a higher reduction speed of the turbocharging pressure is stuck closed, by performing the processing in step S62.

As above, according to the routine shown in FIGS. 5 to 8, when the absolute value of the feedback correction amount of the WGV 50 continuously exceeds the predetermined threshold value, it can be determined that an abnormality occurs to either one of the left bank 2L or the right bank 2R. Subsequently, the ABVs 32L and 32R are individually opened when the turbocharged engine 1 is in a decelerating state, and the operation states of the turbocharged engine 1 can be regarded as substantially the same as each other, and based on the output from the pressure sensor 94 at this time, an abnormality in the WGV 50 and the ABV 32 can be determined. Accordingly, a repair and a replacement work for the WGV 50 or the ABV 32 which is determined as abnormal can be easily performed.

Incidentally, in the above described first embodiment, the V engine having the left bank 2L and the right bank 2R is described as an example, but the present invention also can be applied to an in-line engine including a plurality of cylinders. In that case, the plurality of cylinders are divided into two cylinder groups (a first cylinder group, and a second cylinder group), and the left bank 2L of the above described first embodiment can be replaced with the first cylinder group, and the right bank 2R of the above described first embodiment can be replaced with the second cylinder group, respectively.

Further, in the above described embodiment 1, an abnormality of the WGV 50 and the ABV 32 is determined based on the reduction speed of the turbocharging pressure, but an abnormality may be determined by using a time period required until the turbocharging pressure reduces to a predetermined pressure (the predetermined pressure Pb in FIG. 4, for example) after the opening command to the ABV 32 is issued, instead of the reduction speed of the turbocharging pressure.

Note that in the above described first embodiment, the intake manifold 18L corresponds to "a first intake manifold" of the above described first aspect of the present invention, and the intake manifold 18R corresponds to "a second intake manifold" of the same. The exhaust manifold 40L corresponds to "a first exhaust manifold" of the same, and the exhaust manifold 40R corresponds to "a second exhaust manifold" of the same. The upstream intake passage 10L corresponds to "a first upstream intake passage" of the same, and the upstream intake passage 10R corresponds to "a second upstream passage" of the same. The intake passage 16 corresponds to "a downstream intake passage" of the same. The left bank 2L corresponds to "a first cylinder group" of the same, and the right bank 2R corresponds to "a second cylinder group" of the same. The compressor 62L corresponds to "a first compressor" of the same, and the compressor 62R corresponds to "a second compressor" of the same. The ABV 32L corresponds to "a first air bypass valve" of the same, and the ABV 32R corresponds to "a second air bypass valve" of the same. The turbine 64L corresponds to "a first turbine" of the same, and the turbine 64R corresponds to "a second turbine" of the same. The WGV 50L corresponds to "a first wastegate valve" of the same, and the WGV 50R corresponds to "a second wastegate valve" of the same. The pressure sensor 94 corresponds to "a pressure sensor" of the same. The reduction speed $v_L$ corresponds to "a first rate of reduction" of the same, and the reduction speed $v_R$ corresponds to "a second rate of reduction" of the same, respectively.

Further, the ECU 100 performs the turbocharging pressure feedback control, whereby "feedback control means" in the first aspect of the present invention is realized. The ECU 100 calculates the reduction speed $v_L$ in step S20 in FIG. 5 or step S46 in FIG. 7, whereby "first rate of reduction calculating means" of the same is realized. The ECU 100 calculates the reduction speed $v_R$ in step S30 in FIG. 5 or step S56 in FIG. 7, whereby "second rate of reduction calculating means" of the same is realized. The ECU 100 executes processing in steps S20 and S30 in FIG. 5, step S36 in FIG. 6, steps S46 and S56 in FIG. 7 or step S62 in FIG. 8, whereby "abnormality determining means" of the same is realized.

Second Embodiment

[Features of Second Embodiment]

Figure 9:
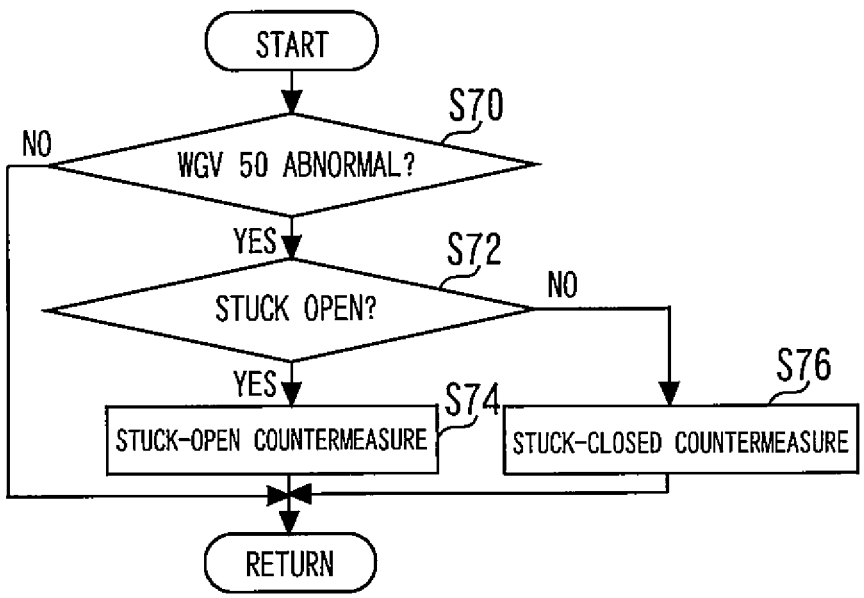
FIG. 9 is an explanatory diagram of an abnormality countermeasure control routine executed by an ECU 100 in a second embodiment.

A second embodiment is predicated on the system configuration of the first embodiment, and has a feature thereof in a content of countermeasure control in a case of an abnormality being determined in the WGV 50. FIG. 9 is an explanatory diagram of an abnormality countermeasure control routine executed by the ECU 100 in the second embodiment. The abnormality countermeasure control routine is repeatedly executed at predetermined periods during an operation of the turbocharged engine 1.

In the routine shown in FIG. 9, it is firstly determined whether or not an abnormality occurs to the WGV 50 (step S70). When it is determined that an abnormality occurs to the WGV 50, it is determined whether the abnormality is caused by the WGV 50 being stuck open, or stuck closed (step S72). If it is determined that the WGV 50 is stuck open or stuck closed in processing in steps S38 and S40 in FIG. 6, and steps S64 and S66 in FIG. 8, the following processing mode is determined by the processing in steps S70 and S72. When it is determined that an abnormality does not occur to the WGV 50 in step S70, the present routine is ended.

When it is determined that the abnormality is caused by the WGV 50 being stuck open in step S72, processing for sticking open countermeasure control is performed (step S74). More specifically, a command for making a valve overlap amount of the intake valve (the intake valve 6L or the intake valve 6R) and the exhaust valve (the exhaust valve 8L or the exhaust valve 8R) zero is issued to the variable valve timing device of the bank at the stuck open side. Thereby, a scavenge amount is restrained from increasing in the bank at the stuck open side. At the same time, a determination temperature for use in increase of an amount (OT increase amount) of injection fuel for cooling the catalyst in the bank at the stuck open side (the first pre-stage catalyst 52L or the first pre-stage catalyst 52R) is changed to a temperature at a low temperature side. Thereby, a temperature rise of the catalyst by exhaust gas that flows in via the bypass channel (the bypass channel 48L or the bypass channel 48R) is restrained. At the same time, execution of a lean operation of the bank at the stuck open side by the operation mode switch control is prohibited. Thereby, a misfire due to execution of a lean operation is prevented.

When it is determined that the abnormality of the WGV 50 is caused by being stuck closed in step S72, processing for stuck-closed countermeasure control is performed (step S76). More specifically, execution of a stoichiometric operation of the bank at the stuck closed side by the operation mode switch control is prohibited. Hereby, overspeed of the turbine at the stuck closed side (the turbine 64L or the turbine 64R) due to execution of a stoichiometric operation is prevented. Overspeed of the turbine at the stuck closed side may be prevented by issuing a closing command to the WGVs 50L and 50R, and prohibiting execution of the stoichiometric operation of both banks by the operation mode switch control.

As above, according to the routine shown in FIG. 9, when an abnormality occurs to the WGV 50, countermeasures corresponding to the cause of the abnormality can be taken. Accordingly, before a repair or a replacement work of the WGV 50 which is determined as abnormal is performed, a new trouble due to the abnormality can be prevented from occurring.

Note that in the above described second embodiment, the ECU 100 executes a series of processing of the routine in FIG. 9, whereby "countermeasure control means" in the above described fifth aspect of the present invention is realized.

The invention claimed is:

1. A control device for an internal combustion engine including a first cylinder group to which a first intake manifold and a first exhaust manifold are connected; a second cylinder group to which a second intake manifold and a second exhaust manifold are connected; a first upstream intake passage and a second upstream intake passage that are connected to the first intake manifold and the second intake manifold via a common downstream intake passage; a first air bypass valve provided in a passage bypassing a first compressor mounted to the first upstream intake passage; a second air bypass valve provided in a passage bypassing a second compressor mounted to the second upstream intake passage; a first wastegate valve provided in a passage bypassing a first turbine that is mounted to the first exhaust manifold and that is connected to the first compressor; and a second wastegate valve provided in a passage bypassing a second turbine that is mounted to the second exhaust manifold and that is connected to the second compressor, the control device comprising:

a throttle valve that is provided in the downstream intake passage;

a pressure sensor that measures a turbocharging pressure upstream of the throttle valve in the downstream intake passage;

feedback control means configured to correct opening degrees of the first wastegate valve and the second wastegate valve so that the measured turbocharging approaches a target turbocharging pressure;

first rate of reduction calculating means configured to issue an opening command to the first air bypass valve at a time of deceleration of the internal combustion engine when an absolute value of a feedback correction amount by the feedback control means exceeds a predetermined value, and to calculate a first rate of reduction of the measured turbocharging pressure;

second rate of reduction calculating means configured to issue an opening command to the second air bypass valve at the time of deceleration of the internal combustion engine when the absolute value exceeds the predetermined value again after calculation of the first rate of reduction of the measured turbocharging pressure, and to calculate a second rate of reduction of the measured turbocharging pressure; and abnormality determining means configured to determine to which one of the first air bypass valve, the second air bypass valve, the first wastegate valve, and the second wastegate valve, an abnormality occurs, based on the feedback correction amount, the first rate of reduction of the measured turbocharging pressure, and the second rate of reduction of the measured turbocharging pressure.

2. The control device according to claim 1, wherein the abnormality determining means compares the first rate of reduction of the measured turbocharging pressure with the second rate of reduction of the measured turbocharging pressure when the feedback correction amount has a positive value, determines that the abnormality occurs to the first wastegate valve when the first rate of reduction of the measured turbocharging pressure is lower than the second rate of reduction of the measured turbocharging pressure, and determines that the abnormality occurs to the second wastegate valve when the second rate of reduction of the measured turbocharging pressure is lower than the first rate of reduction of the measured turbocharging pressure.

3. The control device according to claim 1, wherein the abnormality determining means compares the first rate of reduction of the measured turbocharging pressure with the second rate of reduction of the measured turbocharging pressure when the feedback correction amount has a negative value, determines that the abnormality occurs to the first wastegate valve when the first rate of reduction of the measured turbocharging pressure is higher than the second rate of reduction of the measured turbocharging pressure, and determines that the abnormality occurs to the second wastegate valve when the second rate of reduction of the measured turbocharging pressure is higher than the first rate of reduction of the measured turbocharging pressure.

4. The control device according to claim 2, wherein the abnormality determining means compares the first rate of reduction of the measured turbocharging pressure and the second rate of reduction of the measured turbocharging pressure with a predetermined rate of reduction of the measured turbocharging pressure before comparing the first rate of reduction of the measured turbocharging pressure with the second rate of reduction of the measured turbocharging pressure, determines that the abnormality occurs to the first air bypass valve when the first rate of reduction of the measured turbocharging pressure is lower than the predetermined rate of reduction of the measured turbocharging pressure, and determines that the abnormality occurs to the second air bypass valve when the second rate of reduction of the measured turbocharging pressure is lower than the predetermined rate of reduction of the measured turbocharging pressure.

5. The control device according to claim 3, wherein the abnormality determining means compares the first rate of reduction of the measured turbocharging pressure and the second rate of reduction of the measured turbocharging pressure with a predetermined rate of reduction of the measured turbocharging pressure before comparing the first rate of reduction of the measured turbocharging pressure with the second rate of reduction of the measured turbocharging pressure, determines that the abnormality occurs to the first air bypass valve when the first rate of reduction of the measured turbocharging pressure is lower than the predetermined rate of reduction of the measured turbocharging pressure, and determines that the abnormality occurs to the second air bypass valve when the second rate of reduction of the measured turbocharging pressure is lower than the predetermined rate of reduction of the measured turbocharging pressure.

6. The control device according to claim 2, further comprising countermeasure control means configured to perform countermeasure control when the abnormality of the first wastegate valve or the second wastegate valve is determined.

7. The control device according to claim 3, further comprising countermeasure control means configured to perform countermeasure control when the abnormality of the first wastegate valve or the second wastegate valve is determined.

8. An internal combustion engine comprising:
a first cylinder group to which a first intake manifold and a first exhaust manifold are connected;
a second cylinder group to which a second intake manifold and a second exhaust manifold are connected;
a first upstream intake passage and a second upstream intake passage that are connected to the first intake manifold and the second intake manifold via a common downstream intake passage;
a first compressor mounted to the first upstream intake passage;
a second compressor mounted to the second upstream intake passage;
a first turbine mounted to the first exhaust manifold and connected to the first compressor;
a second turbine mounted to the second exhaust manifold and connected to the second compressor;
a first air bypass valve provided in a first passage bypassing the first compressor; a second air bypass valve provided in a second passage bypassing the second compressor;
a first wastegate valve provided in a third passage bypassing the first turbine;
a second wastegate valve provided in a fourth passage bypassing the second turbine;
a throttle valve that is provided in the downstream intake passage;
a pressure sensor that measures a turbocharging pressure upstream of the throttle valve in the downstream intake passage; and
a controller programmed to:
  (i) execute feedback control to correct opening degrees of the first wastegate valve and the second wastegate valve so that the measured turbocharging approaches a target turbocharging pressure,
  (ii) issue a first opening command to the first air bypass valve at a time of deceleration of the internal combustion engine when an absolute value of a feedback correction amount by the feedback control exceeds a predetermined value, and calculating a first rate of reduction of the measured turbocharging pressure, and
  (iii) issue a second opening command to the second air bypass valve at the time of deceleration of the internal combustion engine when the absolute value exceeds the predetermined value again after calculation of the first rate of reduction of the measured turbocharging pressure, and calculating a second rate of reduction of the measured turbocharging pressure, and
  (iv) determine to which one of the first air bypass valve, the second air bypass valve, the first wastegate valve, and the second wastegate valve, an abnormality occurs, based on the feedback correction amount, the first rate of reduction of the measured turbocharging pressure, and the second rate of reduction of the measured turbocharging pressure.

9. The internal combustion engine according to claim 8, wherein the controller is further programmed to compare the first rate of reduction of the measured turbocharging pressure with the second rate of reduction of the measured turbocharging pressure when the feedback correction amount has a positive value, determines that the abnormality occurs to the first wastegate valve when the first rate of reduction of the measured turbocharging pressure is lower than the second rate of reduction of the measured turbocharging pressure, and determines that the abnormality occurs to the second wastegate valve when the second rate of reduction of the measured turbocharging pressure is lower than the first rate of reduction of the measured turbocharging pressure.

10. The internal combustion engine according to claim 8, wherein the controller is further programmed to compare the first rate of reduction of the measured turbocharging pressure with the second rate of reduction of the measured turbocharging pressure when the feedback correction amount has a negative value, determines that the abnormality occurs to the first wastegate valve when the first rate of reduction of the measured turbocharging pressure is higher than the second rate of reduction of the measured turbocharging pressure, and determines that the abnormality occurs to the second wastegate valve when the second rate of reduction of the measured turbocharging pressure is higher than the first rate of reduction of the measured turbocharging pressure.

11. The internal combustion engine according to claim 9, wherein the controller is further programmed to compare the first rate of reduction of the measured turbocharging pressure and the second rate of reduction of the measured turbocharging pressure with a predetermined rate of reduction of the measured turbocharging pressure before comparing the first rate of reduction of the measured turbocharging pressure with the second rate of reduction of the measured turbocharging pressure, determines that the abnormality occurs to the first air bypass valve when the first rate of reduction of the measured turbocharging pressure is lower than the predetermined rate of reduction of the measured turbocharging pressure, and determines that the abnormality occurs to the second air bypass valve when the second rate of reduction of the measured turbocharging pressure is lower than the predetermined rate of reduction of the measured turbocharging pressure.

12. The internal combustion engine according to claim 10, wherein the controller is further programmed to compare the first rate of reduction of the measured turbocharging pressure and the second rate of reduction of the measured turbocharging pressure with a predetermined rate of reduction of the measured turbocharging pressure before comparing the first rate of reduction of the measured turbocharging pressure with the second rate of reduction of the measured turbocharging pressure, determines that the abnormality occurs to the first air bypass valve when the first rate of reduction of the measured turbocharging pressure is lower than the predetermined rate of reduction of the measured turbocharging pressure, and determines that the abnormality occurs to the second air bypass valve when the second rate of reduction of the measured turbocharging pressure is lower than the predetermined rate of reduction of the measured turbocharging pressure.

13. The internal combustion engine according to claim 9, wherein the controller is further programmed to perform countermeasure when the abnormality of the first wastegate valve or the second wastegate valve is determined.

14. The internal combustion engine according to claim 10, wherein the controller is further programmed to perform countermeasure control when the abnormality of the first wastegate valve or the second wastegate valve is determined.

* * * * *